(12) United States Patent
Shimada et al.

(10) Patent No.: US 12,485,601 B2
(45) Date of Patent: Dec. 2, 2025

(54) TEMPERATURE ADJUSTMENT MOLD AND APPARATUS AND METHOD FOR PRODUCING RESIN CONTAINER

(71) Applicant: NISSEI ASB MACHINE CO., LTD., Nagano (JP)

(72) Inventors: Kiyonori Shimada, Nagano (JP); Tomomi Tsuchiya, Nagano (JP); Koichi Ikeda, Nagano (JP); Yuya Miyasaka, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 110 days.

(21) Appl. No.: 18/278,045

(22) PCT Filed: Feb. 22, 2022

(86) PCT No.: PCT/JP2022/007285
§ 371 (c)(1),
(2) Date: Aug. 21, 2023

(87) PCT Pub. No.: WO2022/181618
PCT Pub. Date: Sep. 1, 2022

(65) Prior Publication Data
US 2024/0123671 A1 Apr. 18, 2024

(30) Foreign Application Priority Data
Feb. 25, 2021 (JP) .................. 2021-028430

(51) Int. Cl.
*B29C 49/64* (2006.01)
*B29C 49/06* (2006.01)
*B29C 49/42* (2006.01)
*B29C 49/48* (2006.01)
*B29C 49/78* (2006.01)
*B29L 31/00* (2006.01)

(52) U.S. Cl.
CPC .......... *B29C 49/6419* (2022.05); *B29C 49/06* (2013.01); *B29C 49/4252* (2013.01);
(Continued)

(58) Field of Classification Search
CPC ... B29C 49/786; B29C 49/06; B29C 49/6435; B29C 49/6465; B29C 49/6419;
(Continued)

(56) References Cited

U.S. PATENT DOCUMENTS 5,290,506 A 3/1994 Yokobayashi
5,744,176 A 4/1998 Takada et al.
(Continued)

FOREIGN PATENT DOCUMENTS

JP 48-74562 A 10/1973
JP 51-77661 A 7/1976
(Continued)

OTHER PUBLICATIONS

Machine translation of JP 05-131528 (Year: 1993).*
(Continued)

*Primary Examiner* — Monica A Huson
(74) *Attorney, Agent, or Firm* — GREENBLUM & BERNSTEIN, P.L.C.

(57) ABSTRACT

A temperature adjustment mold capable of performing local temperature adjustment in an axial direction from the inside of a preform while restricting shrinkage and deformation of the preform, for adjusting a temperature of an injection-molded bottomed resin-made preform includes a rod portion inserted into the preform and extending in the axial direction of the preform. The rod portion includes an annular projection portion that protrudes in a radial direction of the rod portion and contacts an inner peripheral surface of the preform. The rod portion contacts a bottom portion of the preform to restrict shrinkage in the axial direction of the preform. The projection portion restricts shrinkage in a radial direction of the preform, conducts heat between the rod portion and the preform, and adjusts a temperature at a predetermined part in an axial direction of the preform.

5 Claims, 7 Drawing Sheets

(52) U.S. Cl.
CPC ........ *B29C 49/4823* (2013.01); *B29C 49/786* (2013.01); *B29C 2049/4854* (2022.05); *B29C 2049/7861* (2022.05); *B29L 2031/712* (2013.01)

(58) Field of Classification Search
CPC . B29C 49/062; B29C 49/4252; B29C 49/643; B29C 49/4823; B29C 49/6466; B29C 2949/3032; B29C 2049/7861; B29C 2949/22; B29C 2949/26; B29C 49/42392; B29C 2949/0715; B29C 2049/065; B29C 49/6445; B29C 49/6825; B29C 2049/4854; B29C 49/645; B29C 2049/023; B29C 49/683; B29C 2949/28; B29C 2949/24; B29C 49/6418; B29L 2031/712
See application file for complete search history.

(56) References Cited

U.S. PATENT DOCUMENTS

| | | |
|---|---|---|
| 2005/0147712 A1 | 7/2005 | Pesavento |
| 2014/0131920 A1 | 5/2014 | Nakahara et al. |
| 2022/0055279 A1 | 2/2022 | Oike et al. |

FOREIGN PATENT DOCUMENTS

| | | |
|---|---|---|
| JP | 02-086424 A | 3/1990 |
| JP | 05-131528 A | 5/1993 |
| JP | 05-330535 A | 12/1993 |
| JP | 08-132517 A | 5/1996 |
| JP | 3255485 B2 | 2/2002 |
| JP | 3330677 B2 | 9/2002 |
| WO | 2020/138292 A1 | 7/2020 |

OTHER PUBLICATIONS

International Search Report issued Mar. 29, 2022 in International Bureau of WIPO Patent Application No. PCT/JP2022/007285 with an English translation thereof.
Written Opinion issued Mar. 29, 2022 in International Bureau of WIPO Patent Application No. PCT/JP2022/007285 with an English translation thereof.
Supplementary European Search Report dated Feb. 10, 2025 issued in European family member application No. 22759654.1.

* cited by examiner

TEMPERATURE ADJUSTMENT MOLD AND APPARATUS AND METHOD FOR PRODUCING RESIN CONTAINER

BACKGROUND OF THE INVENTION

Field of the Invention

The present invention relates to a temperature adjustment mold, an apparatus and a method for producing a resin container.

Description of the Related Art

Conventionally, a hot parison type blow molding apparatus is known as one of apparatuses for producing a resin container. The hot parison type blow molding apparatus is configured to blow-mold a resin container using residual heat from injection molding of a preform, and is advantageous in that it is possible to produce resin containers which are diversified and excellent in aesthetic appearance as compared with the cold parison type.

In general, the preform immediately after injection molding does not have a temperature distribution suitable for shaping the container. Therefore, in the hot parison type blow molding cycle, the temperature adjustment step of the preform is performed between the injection molding step and the blow molding step in order to suppress uneven temperature of the preform or impart a desired temperature distribution suitable for shaping the container to the preform.

In this type of temperature adjustment step, a temperature adjustment rod mold following the internal shape of the preform may be inserted into the preform, and the temperature adjustment rod mold may be brought into close contact with the inner peripheral surface of the preform to adjust the temperature (for example, JP 3330677 A and JP 3255485 A).

Since the conventional temperature adjustment rod mold is in close contact with the inner peripheral surface of the preform, it is not suitable for temperature adjustment that imparts a temperature difference in the axial direction. Therefore, for example, it has been difficult to improve the thickness distribution of the container by locally cooling a part corresponding to the thin portion of the container from the inside of the preform while restricting shrinkage and deformation of the preform.

SUMMARY OF THE INVENTION

One aspect of the present invention is a temperature adjustment mold for adjusting the temperature of a preform that is injection-molded, has a bottomed shape, and is made of resin. The temperature adjustment mold includes a rod portion inserted into the preform and extending in an axial direction of the preform. The rod portion includes an annular projection portion that protrudes in a radial direction of the rod portion and comes into contact with an inner peripheral surface of the preform. The rod portion comes into contact with a bottom portion of the preform to restrict shrinkage in the axial direction of the preform. The projection portion restricts shrinkage in a radial direction of the preform, conducts heat between the rod portion and the preform, and adjusts a temperature at a predetermined part in an axial direction of the preform.

Further features of the present invention will become apparent from the following description of exemplary embodiments with reference to the attached drawings.

DESCRIPTION OF THE EMBODIMENTS

Figure 1:
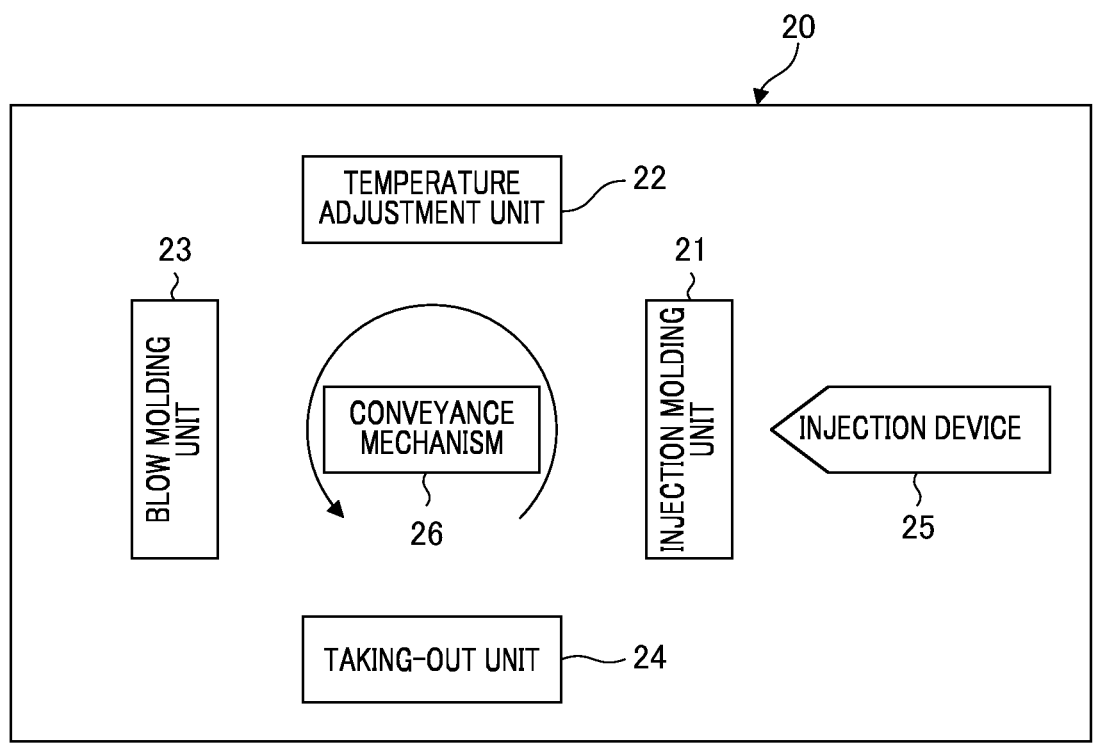
FIG. 1 is a diagram schematically showing a configuration of a blow molding apparatus of the present embodiment.

Hereinafter, embodiments of the present invention will be described with reference to the drawings.

In the embodiment, for easy understanding, the description of structures and elements other than main portions of the present invention will be simplified or omitted. In addition, in the drawings, the same reference numerals are assigned to the same elements. Further, shapes, dimensions, and the like of the respective elements illustrated in the drawings are schematically set and may not represent actual shapes, dimensions, and the like.

FIG. 1 is a diagram schematically showing a configuration of a blow molding apparatus 20 of the present embodiment. The blow molding apparatus 20 of the present embodiment is a hot parison type (also referred to as a one-stage type) apparatus that blow-molds a container using residual heat (internal heat quantity) from injection molding without cooling the preform 10 to room temperature.

The blow molding apparatus 20 includes an injection molding unit 21, a temperature adjustment unit 22, a blow molding unit 23, a taking-out unit 24, and a conveyance mechanism 26. The injection molding unit 21, the temperature adjustment unit 22, the blow molding unit 23, and the taking-out unit 24 are disposed at respective positions rotated by a predetermined angle (for example, 90 degrees) around the conveyance mechanism 26.

(Conveyance Mechanism 26)

The conveyance mechanism 26 includes a transfer plate 28 (not illustrated in FIG. 1) that moves to rotate around an axis in a direction perpendicular to the paper surface of FIG. 1. On the transfer plate 28, one or more neck molds 27 (not illustrated in FIG. 1) for holding the neck portion of the preform 10 or the resin container (hereinafter simply referred to as a container) are arranged at each of predetermined angles. The conveyance mechanism 26 moves the transfer plate 28 by 90 degrees to convey the preform 10 (or the container) of which the neck portion is held by the neck mold 27 to the injection molding unit 21, the temperature adjustment unit 22, the blow molding unit 23, and the taking-out unit 24 in this order. Note that the conveyance mechanism 26 further includes a lifting and lowering mechanism (vertical mold opening/closing mechanism) and a mold opening mechanism of the neck mold 27, and also performs an operation of lifting and lowering the transfer plate 28 and an operation related to mold closing and mold opening (mold release) in the injection molding unit 21 and the like.

(Injection Molding Unit 21)

Figure 2:
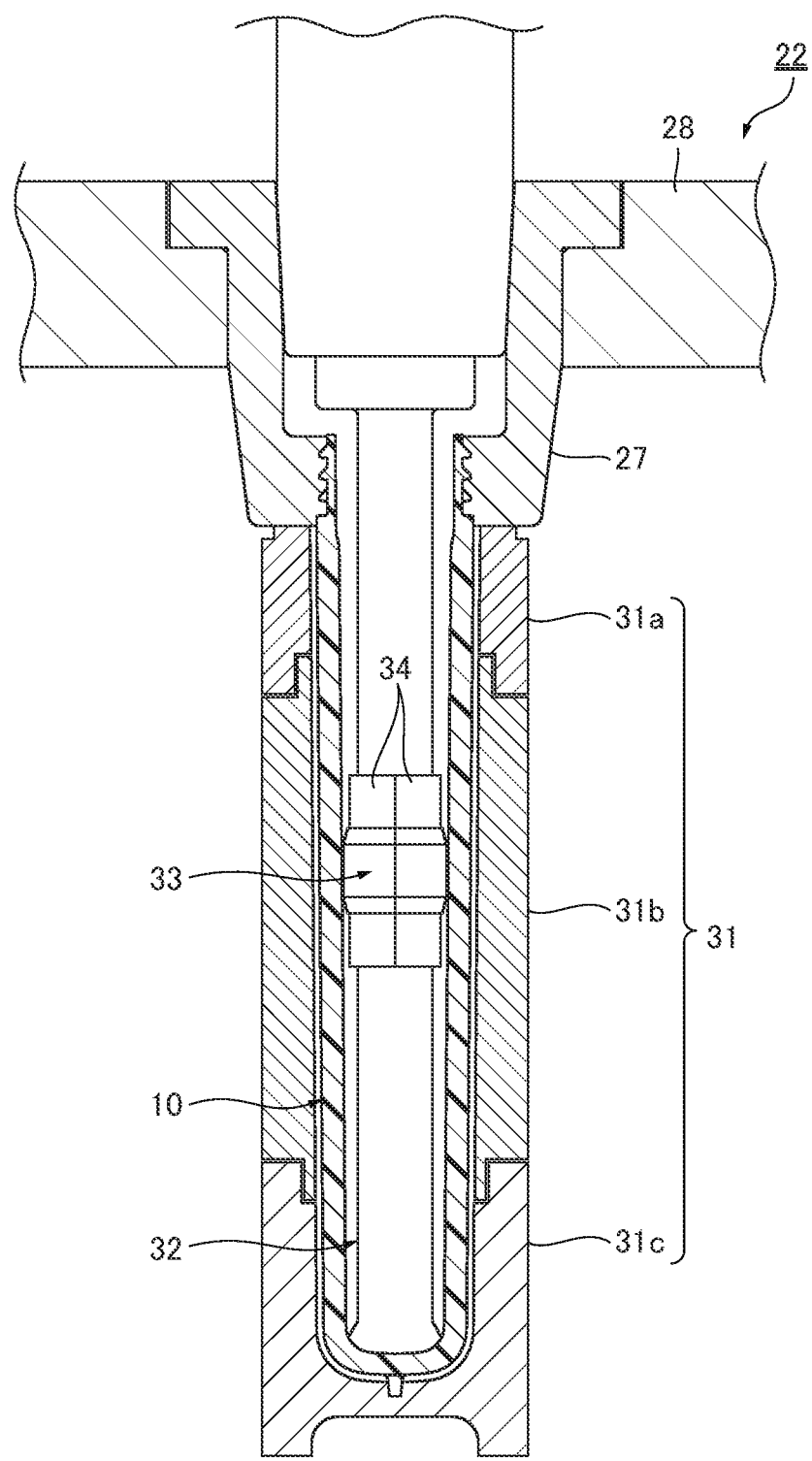
FIG. 2 is a longitudinal sectional view showing a configuration example of a temperature adjustment unit.

The injection molding unit 21 includes an injection cavity mold and an injection core mold (not illustrated), and produces the preform 10 illustrated in FIG. 2. An injection device 25 that supplies a resin material, which is a raw material of the preform 10, is connected to the injection molding unit 21.

In the injection molding unit 21, the injection cavity mold, the injection core mold, and the neck mold 27 of the conveyance mechanism 26 are closed to form a preform-shaped mold space. Then, by pouring the resin material from the injection device 25 into the mold space having such a preform shape, the preform 10 is produced by the injection molding unit 21.

For example, the entire shape of the preform 10 is a bottomed cylindrical shape of which one end side is open and the other end side is closed. A neck portion is formed at an end portion of the preform 10 on the opening side.

The material of the container and the preform 10 is a thermoplastic synthetic resin, and can be appropriately selected according to the use of the container. Examples of specific types of material include polyethylene terephthalate (PET), polyethylene naphthalate (PEN), polycyclohexanedimethylene terephthalate (PCTA), Tritan (registered trademark: copolyester produced by Eastman Chemical Co., Ltd.), polypropylene (PP), polyethylene (PE), polycarbonate (PC), polyethersulfone (PES), polyphenylsulfone (PPSU), polystyrene (PS), a cyclic olefin polymer (COP/COC), polymethyl methacrylate: acrylic (PMMA), polylactic acid (PLA), and the like.

In addition, even when the mold of injection molding unit 21 is opened, the neck mold 27 of the conveyance mechanism 26 is not opened, and the preform 10 is held and conveyed as it is. The number of the preforms 10 simultaneously molded by the injection molding unit 21 (that is, the number of containers that can be simultaneously molded by the blow molding apparatus 20) can be appropriately set.

(Temperature Adjustment Unit 22)

The temperature adjustment unit 22 performs temperature equalization and removal of uneven temperature of the preform 10 produced by the injection molding unit 21, and adjusts the temperature of the preform 10 to a temperature suitable for blow molding (for example, approximately 90° C. to 105° C.) and a temperature distribution suitable for a container shape to be shaped. In addition, the temperature adjustment unit 22 also has a function of cooling the preform 10 in a high temperature state after the injection molding.

FIG. 2 is a longitudinal sectional view showing a configuration example of the temperature adjustment unit 22. The temperature adjustment unit 22 includes a cavity mold (temperature adjustment pot mold, heating pot mold) 31 capable of accommodating the preform 10, and a temperature adjustment rod 32 that is a mold member inserted into the preform.

The cavity mold 31 has a space for temperature adjustment having substantially the same shape as the outer shape of the preform 10 produced by the injection molding unit 21. The cavity mold 31 is divided into at least three in the axial direction of the preform 10, and includes an upper mold 31a, a middle mold 31b, and a lower mold 31c.

The upper mold 31a is a mold facing the outer peripheral surface in the vicinity of the neck portion of the preform 10. The middle mold 31b is a mold facing the outer peripheral surface of the body portion of the preform 10. The lower mold 31c is a mold facing the outer peripheral surface of the bottom portion of the preform 10. The bottom surface of the upper mold 31a and the upper surface of the middle mold 31b, and the bottom surface of the middle mold 31b and the upper surface of the lower mold 31c are engaged with each other in a spigot structure to sandwich a heat insulating member therebetween, for example.

A heating member (not illustrated) such as a band heater (ring-shaped heater) or a rod-shaped heater is attached to each of the upper mold 31a, the middle mold 31b, and the lower mold 31c of the cavity mold 31. The upper mold 31a, the middle mold 31b, and the lower mold 31c are each maintained at a predetermined temperature by a heating member. Then, the outer peripheral side of the preform 10 is heated by the heat from the cavity mold 31, and accordingly, the temperature of the preform 10 is adjusted. The body portion of the heated preform 10 contracts and deforms toward the inner diameter side and the neck portion side. The temperature distribution in the axial direction of the preform 10 can also be changed by changing the temperatures of the heating members of the upper mold 31a, the middle mold 31b, and the lower mold 31c.

The temperature adjustment rod 32 is an example of a rod portion (rod member), and is configured to be able to move forward and backward in the axial direction (vertical direction in the drawing) with respect to the neck mold 27 holding the preform 10 in the temperature adjustment unit 22. FIG. 2 shows a state where the temperature adjustment rod 32 is moved (lowered) to the lower side in the drawing by a rod drive mechanism (not illustrated) and inserted into the neck mold 27 and the preform 10.

The diameter of the temperature adjustment rod 32 is set to be smaller than the inner diameter of the preform 10. The tip end of the temperature adjustment rod 32 inserted into the preform 10 comes into contact with the bottom portion of the preform 10. The axial length of the temperature adjustment rod 32 is set to a length that assumes the amount of shrinkage of the preform 10 until the temperature adjustment rod 32 is inserted after being conveyed out from the injection molding unit 21. As a result, the temperature adjustment rod 32 has a function of maintaining the axial length of the preform 10 at a predetermined dimension at the time of temperature adjustment and restricting excessive shrinkage of the preform 10.

Inside the temperature adjustment rod 32, a flow path (not illustrated) through which the temperature adjustment medium flows is formed along the axial direction. Therefore, the temperature adjustment rod 32 is maintained at a predetermined temperature by the temperature adjustment medium flowing inside. In the present embodiment, a case where the temperature adjustment rod 32 is set to a temperature lower than that of the preform 10 and the preform 10 is cooled by the temperature adjustment rod 32 will be described, but the preform 10 can also be heated by the temperature adjustment rod 32.

Figure 3:
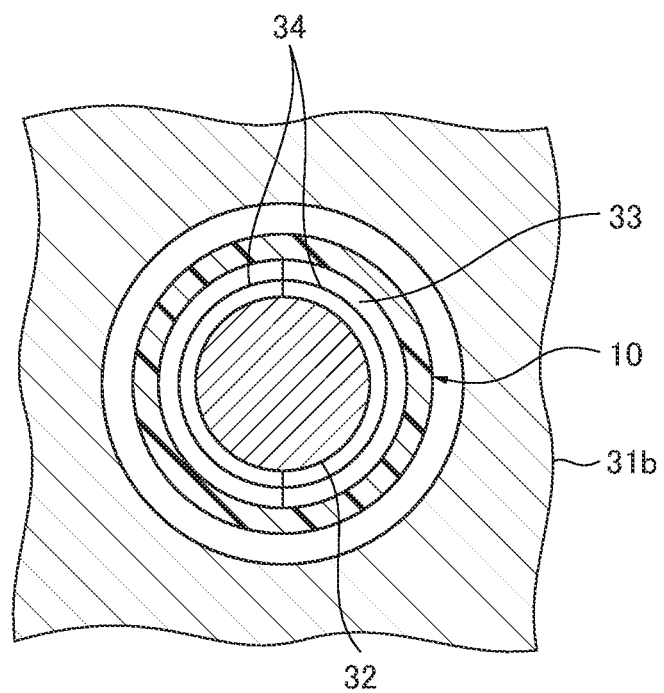
FIG. 3 is a transverse sectional view of the vicinity of a projection portion of a temperature adjustment unit.

The temperature adjustment rod 32 has an annular projection portion 33 protruding radially outward. FIG. 3 is a transverse sectional view of the vicinity of the projection portion of the temperature adjustment unit 22. Also in FIG. 3, the flow path in the temperature adjustment rod 32 is not illustrated.

The projection portions 33 shown in FIGS. 2 and 3 are attachable to and detachable from temperature adjustment rod 32, and include a pair of half ring bodies 34 made of a material having good heat conductivity. The half ring body 34 has an annular large diameter portion (projection portion 33) on the outer peripheral side, and the attachment position can be adjusted in the axial direction of the temperature adjustment rod 32. The pair of half ring bodies 34 (projection portions 33) is fixed to the temperature adjustment rod 32 by fixing means (not illustrated).

The projection portion 33 has a function of coming into contact with a predetermined part in the axial direction of the preform 10 from the inside to adjust the temperature of the predetermined part. At a part which is in contact with the projection portion 33 inside the preform 10, heat is conducted to the temperature adjustment rod 32 via the projection portion 33. On the other hand, since air is interposed between the temperature adjustment rod 32 and the preform 10 at a part which is not in contact with the projection portion 33 inside the preform 10, heat of the temperature adjustment rod 32 is less likely to be transferred. Therefore, it is possible to adjust the temperature distribution in the axial direction of the preform 10 at the position of the projection portion 33.

In addition, the projection portion 33 comes into contact with the inner periphery of the preform 10 as described above, and accordingly, the preform 10 is less likely to shrink toward the inner diameter side from the projection portion 33. Therefore, the projection portion 33 also has a function of maintaining the dimension in the radial direction of the preform 10 at the time of temperature adjustment and restricting excessive shrinkage of the preform 10.

The outer diameter of the projection portion 33 is appropriately set in consideration of the temperature adjustment time by the projection portion 33 according to the amount of shrinkage of the preform 10. When the outer diameter of the projection portion 33 is increased, the shrinking preform 10 and the projection portion 33 come into contact with each other relatively quickly, and the temperature adjustment time by the contact with the projection portion 33 becomes long. On the other hand, when the outer diameter of the projection portion 33 is reduced, the contact between the shrinking preform 10 and the projection portion 33 is delayed as compared with the case where the outer diameter of the projection portion 33 is large, and the temperature adjustment time is shortened. Therefore, by adjusting the outer diameter of the projection portion 33, the contact time between the predetermined part of the preform 10 and the projection portion 33 changes, and the temperature adjustment time for the predetermined part of the preform 10 can be adjusted. The above adjustment may be performed, for example, by preparing a plurality of types of half ring bodies 34 having different outer diameters of the projection portions 33 and appropriately replacing the half ring body 34 according to the container shape to be produced and the specifications of the material of the preform 10 and the like.

FIG. 2 shows an example in which the projection portion 33 is disposed at the axially intermediate portion of the temperature adjustment rod 32 to cool the corresponding part of the preform 10 forming the shoulder portion of the container. By locally cooling the part of the preform 10 corresponding to the shoulder portion of the container to reduce the residual heat, the thickness of the shoulder portion of the container can be increased during blow molding, and the thickness distribution of the container can be improved.

Figure 4:
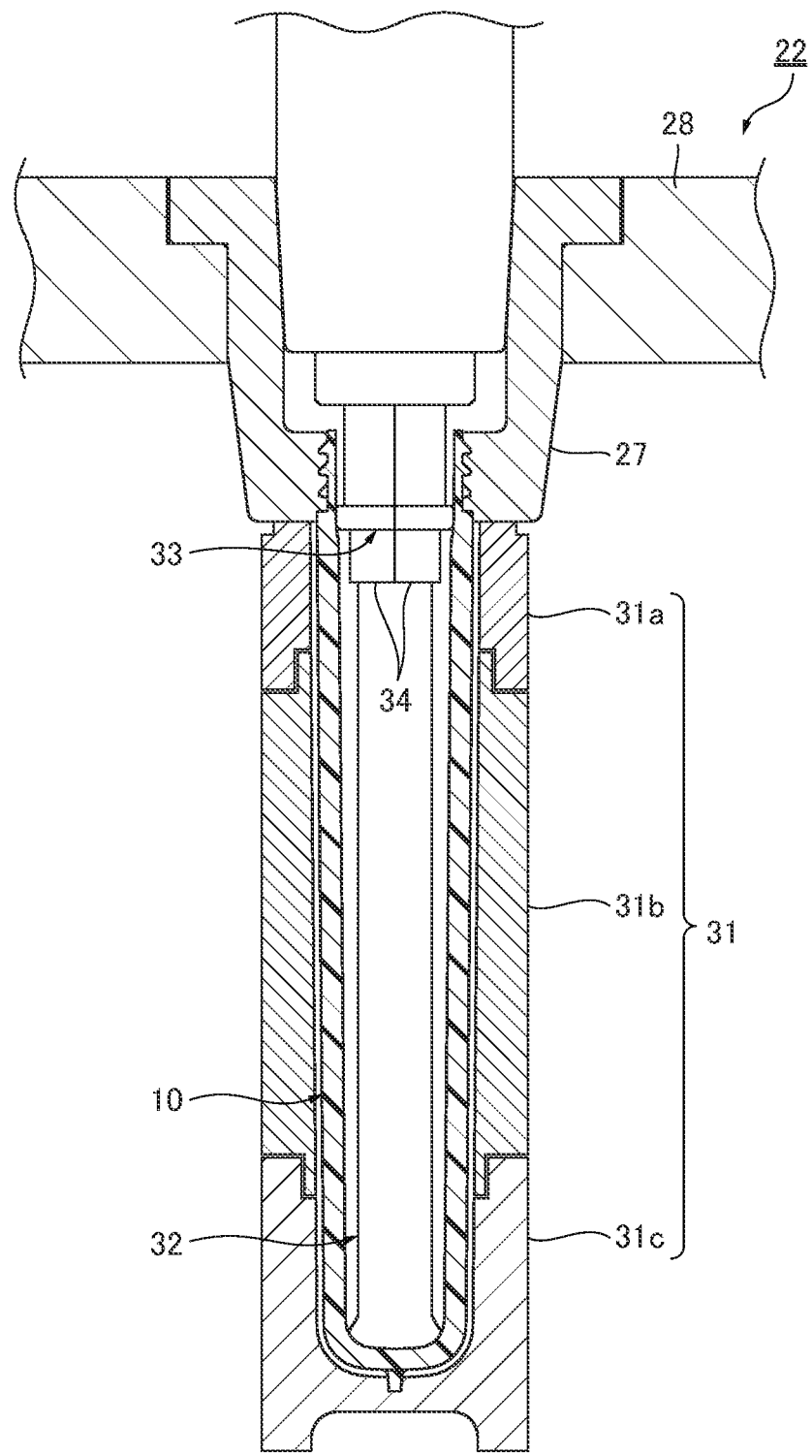
FIG. 4 is a view showing a modification example of FIG. 2.

FIG. 4 is a modification example of FIG. 2, and shows an example in which the vicinity of the boundary portion between the neck mold 27 and the upper mold 31a (corresponding part below the neck of the preform 10) is cooled by the projection portion 33. Also in FIG. 4, similarly to the example of FIG. 2, the projection portion 33 is formed of a pair of half ring bodies 34. According to the example of FIG. 4, by locally cooling the underside of the neck to lower the fluidity of the resin at the same site, it is possible to suppress generation of burrs in the gap between the neck mold 27 and the upper mold 31a or between the neck mold 27 and the blow mold upper surface.

Figure 5:
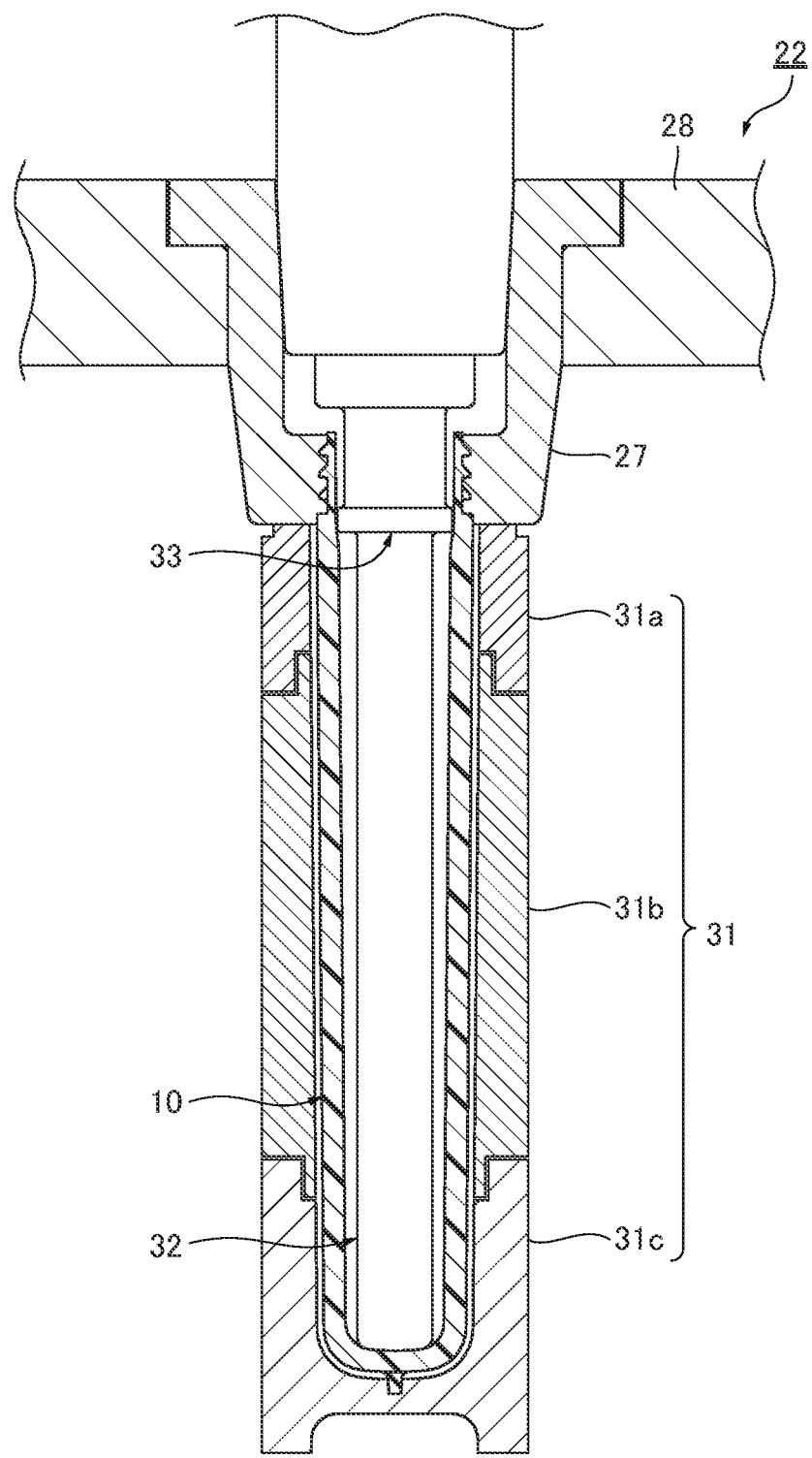
FIG. 5 is a view showing a modification example of FIG. 4.

FIG. 5 is a modification example of FIG. 4, and shows an example in which the projection portion 33 is integrally formed on the temperature adjustment rod 32 at the position below the neck. Also in the example of FIG. 5, the same effect as that of FIG. 4 can be obtained.

Figure 6:
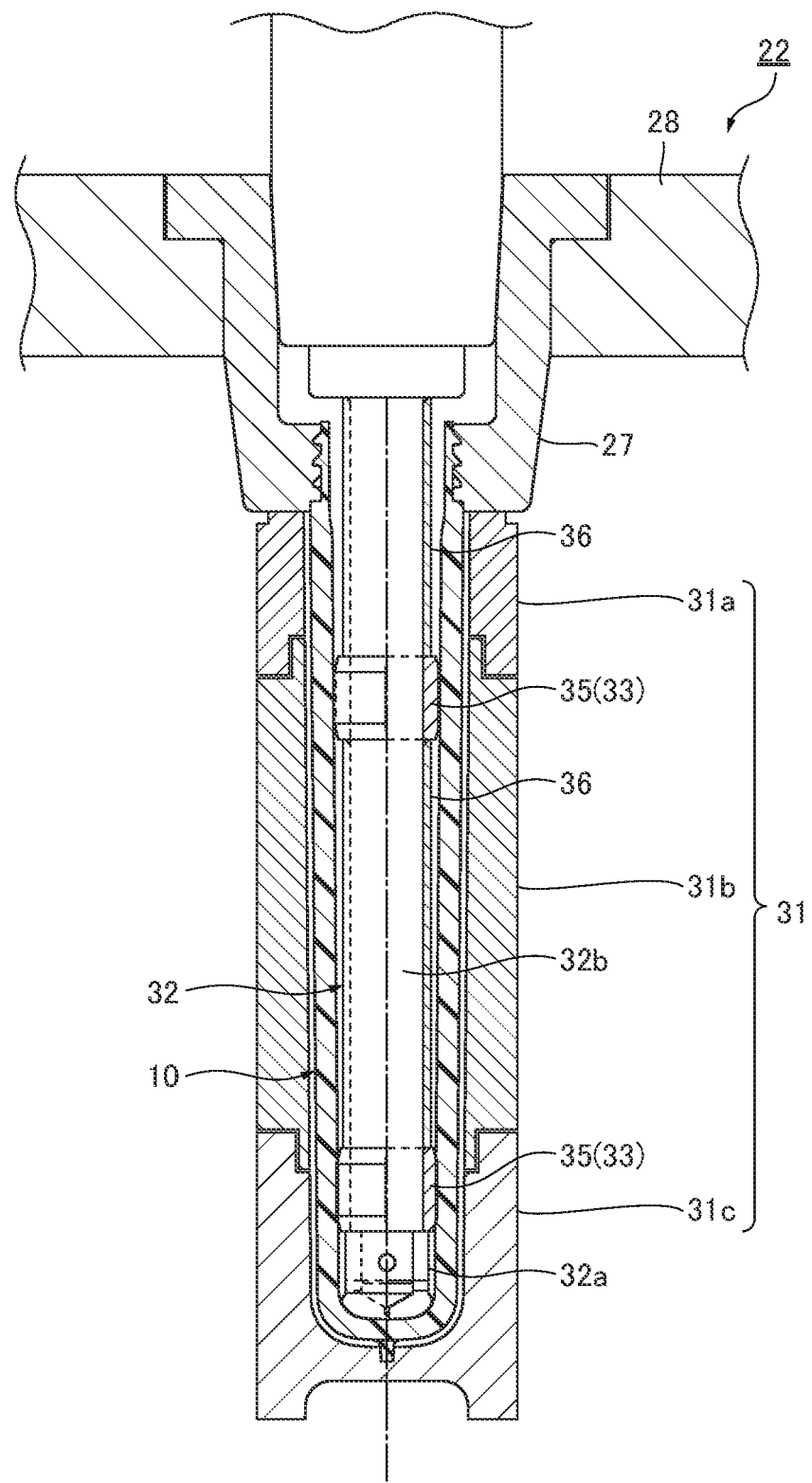
FIG. 6 is a view showing another modification example of FIG. 2.

FIG. 6 is another modification example of FIG. 2, and shows a configuration example in which an annular contact ring 35 constituting the projection portion 33 and a cylindrical spacer 36 are put on the temperature adjustment rod 32. Note that the configuration and function of the cavity mold 31 in FIG. 6 are similar to those in FIGS. 2 to 5, and thus redundant description will be omitted.

Inner diameters of the annular contact ring 35 and the cylindrical spacer 36 are each set to a dimension into which the temperature adjustment rod 32 can be inserted. At least one or more contact rings 35 and at least one or more (more preferably, two or more) spacers 36 are inserted into the temperature adjustment rod 32 and disposed concentrically on the outer circumference of the rod main body 32b of the temperature adjustment rod 32. FIG. 6 shows an example in which two contact rings 35 and two spacers 36 each are attached to the temperature adjustment rod 32.

The outer diameter of the contact ring 35 is set to be larger than the outer diameter of the spacer 36. The contact ring 35 attached to the temperature adjustment rod 32 protrudes to the outer peripheral side of the spacer 36 to come into contact with the inner side of the preform 10, and conducts the heat of the preform 10 to the temperature adjustment rod 32. Therefore, the contact ring 35 has a function of the projection portion 33 that comes into contact with a predetermined part in the axial direction of the preform 10 from the inside to adjust (cool) the temperature of the predetermined part.

The spacer 36 is attached to the temperature adjustment rod 32 to axially position the contact ring 35. In addition, the spacer 36 has a function of forming an air layer with the inner periphery of the preform 10 without coming into contact with the preform 10, for example. As described above, the temperature distribution in the axial direction of the preform 10 can be adjusted at the position of the contact ring 35.

The temperature adjustment rod 32 includes a tip end piece 32a. The tip end piece 32a has a larger diameter than the rod main body 32b, and is attachable to and detachable from the tip end of the rod main body 32b. The contact ring 35 and the spacer 36 are inserted into the rod main body 32b in a state where the tip end piece 32a is removed. The tip end piece 32a is attached to the tip end of the rod main body 32b after the contact ring 35 and the spacer 36 are inserted into the rod main body 32b, and prevents the contact ring 35 and the spacer 36 from coming off. More specifically, after the stepped portion at the lower end (tip end) of the temperature adjustment rod 32 is accommodated in the recess portion at the upper end of the tip end piece 32a, a stopper pin (not illustrated) is inserted into the through-hole formed in each of the temperature adjustment rod 32 and the tip end piece to prevent the contact ring 35 and the spacer 36 from coming off. The spacer 36 and the tip end piece 32a function as fixing means for fixing the contact ring 35 (projection portion 33) to the temperature adjustment rod 32.

Also in the example of FIG. 6, the same effect as that of FIG. 2 can be obtained. In the example of FIG. 6, the outer diameter and the number of the contact rings 35 and the axial position of the contact ring 36 defined by the spacer 36 can be appropriately changed by replacing the contact ring 35 and the spacer 36.

(Blow Molding Unit 23)

Returning to FIG. 1, the blow molding unit 23 performs stretch blow molding on the preform 10 having a temperature adjusted by the temperature adjustment unit 22 to produce the container.

The blow molding unit 23 includes a blow cavity mold which is a pair of split molds corresponding to the shape of the container, a bottom mold, a stretching rod, and an air introduction member (blow core mold, none of these illustrated). The blow molding unit 23 performs blow molding on the preform 10 while stretching the preform 10. Consequently, the preform 10 is shaped into a shape of the blow cavity mold, and the container can be produced.

(Taking-Out Unit 24)

The taking-out unit 24 is configured to open the neck portion of the container produced by the blow molding unit 23 from the neck mold 27 and unload the container to the outside of the blow molding apparatus 20.

(Description of Blow Molding Method)

Next, a blow molding method by the blow molding apparatus 20 of the present embodiment will be described.

Figure 7:
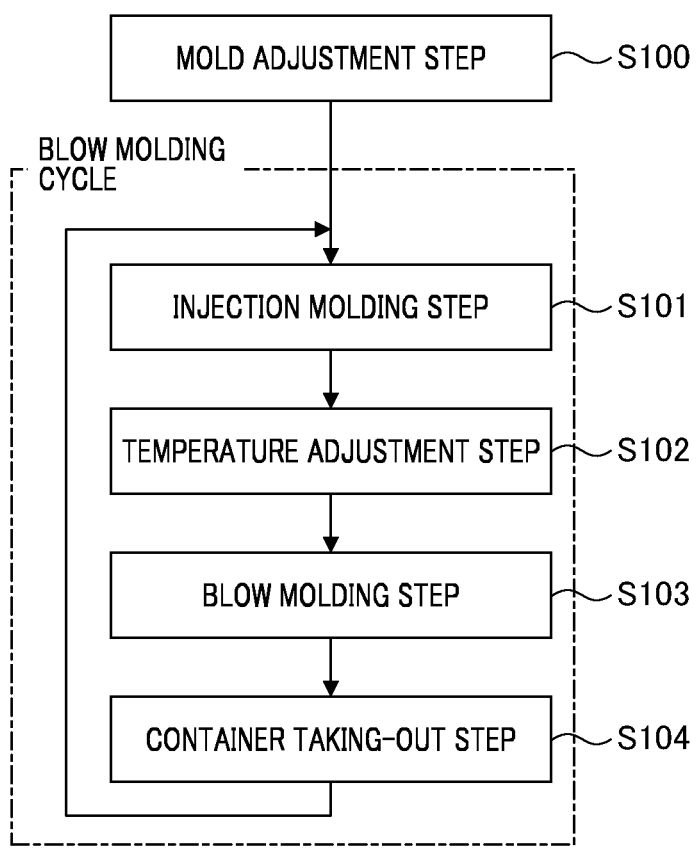
FIG. 7 is a flowchart showing steps of a blow molding method.

FIG. 7 is a flowchart showing steps of the blow molding method. In the present embodiment, a mold adjustment step (S100) is performed before each step (S101 to S104) described later of the blow molding method is performed.

(Step S100: Mold Adjustment Step)

The mold adjustment step is a step of adjusting the position of the projection portion 33 of the temperature adjustment rod 32 according to the shape or the like of the container to be shaped. As an example, the following operation is performed in the mold adjustment step.

First, the blow molding apparatus 20 is subjected to a test operation to obtain information on the container shape before adjustment. Next, the axial position of the projection portion 33 of the temperature adjustment rod 32 is adjusted based on the information on the container shape. At this time, the temperature adjustment time by the temperature adjustment rod 32 may be changed by changing the outer diameter of the projection portion 33 by changing the part or the like.

For example, when there is a thin portion in the axial direction of the container, the operator adjusts the position of the projection portion 33 of the temperature adjustment rod 32 such that the part of the preform 10 corresponding to the thin portion of the container comes into contact with the projection portion 33. As a result, the part of the preform 10 corresponding to the thin portion of the container comes into contact with the projection portion 33 and is locally cooled, and the thickness distribution of the container after adjustment is improved.

In addition, for example, when a burr is generated under the neck of the container, the operator performs adjustment such that the projection portion 33 of the temperature adjustment rod 32 is positioned in the vicinity of the boundary portion between the neck mold 27 and the upper mold 31a (corresponding part under the neck of the preform 10). As a result, the part under the neck of the preform 10 is locally cooled, and the generation of burrs under the neck of the container is suppressed.

When the mold adjustment step is completed, each step of the blow molding cycle described below is executed.

(Step S101: Injection Molding Step)

In step S101, in the injection molding unit 21, the resin is injected from the injection device 25 into the preform-shaped mold space formed by the injection cavity mold, the injection core mold, and the neck mold 27 of the conveyance mechanism 26 to produce the preform 10.

In step S101, when the injection molding of the preform 10 is completed, the mold of injection molding unit 21 is opened, and the preform 10 is released from the injection cavity mold and the injection core mold. Next, the transfer plate 28 of the conveyance mechanism 26 moves to rotate by a predetermined angle, and the preform 10 held by the neck mold 27 is conveyed to the temperature adjustment unit 22.

(Step S102: Temperature Adjustment Step)

Subsequently, the temperature adjustment unit 22 performs temperature adjustment for bringing the temperature of the preform 10 close to a temperature suitable for the final blow.

In the temperature adjustment step, the preform 10 held by the neck mold 27 is accommodated in the cavity mold 31 by lowering the transfer plate 28. When the temperature adjustment rod 32 is lowered, the temperature adjustment rod 32 is inserted into the preform 10.

In the temperature adjustment unit 22, the preform 10 is heated from the outside in a non-contact state by the cavity mold 31. As a result, the temperature of the preform 10 is adjusted not to be equal to or lower than a temperature suitable for blow molding, and the uneven temperature generated from injection molding is also reduced. In addition, the inner peripheral surface of the preform 10 comes into contact with the projection portion of the temperature adjustment rod 32 due to the shrinkage of the preform 10, and accordingly, a predetermined part of the preform 10 is locally cooled.

After the temperature adjustment step, the transfer plate 28 of the conveyance mechanism 26 moves to rotate by a predetermined angle, and the temperature adjusted preform 10 held by the neck mold 27 is conveyed to the blow molding unit 23.

(Step S103: Blow Molding Step)

Subsequently, in the blow molding unit 23, blow molding of the container is performed.

First, the blow cavity mold is closed, the preform 10 is accommodated in the mold space, and the air introduction member (blow core) is lowered, and accordingly, the air introduction member abuts on the neck portion of the preform 10. Then, the stretching rod (longitudinal stretching member is lowered to hold the bottom portion of the preform 10 from an inner surface thereof, and while longitudinal stretching is performed as necessary, blow air is supplied from the air introduction member, and accordingly, the preform 10 is longitudinally stretched. Consequently, the preform 10 is inflated and shaped to be in close contact with the mold space of the blow cavity mold and is blow-molded into the container. Note that the bottom mold stands by at a lower position which is not in contact with the bottom portion of the preform 10 before closing the blow cavity mold, and quickly rises to the molding position before closing the mold or after closing the mold.

(Step S104: Container Taking-Out Step)

When the blow molding is completed, the blow cavity mold and the bottom mold are opened. Consequently, the container is movable from the blow molding unit 23.

Subsequently, the transfer plate 28 of the conveyance mechanism 26 moves to rotate by a predetermined angle, and the container is conveyed to the taking-out unit 24. In the taking-out unit 24, the neck portion of the container is opened from the neck mold 27, and the container is unloaded to the outside of the blow molding apparatus 20.

This completes the series of steps of the blow molding cycle. Thereafter, by moving the transfer plate 28 of the conveyance mechanism 26 to rotate by the predetermined angle, the respective steps of S101 to S104 described above are repeated. Further, during an operation of the blow molding apparatus 20, four sets of the containers having a time difference between each step are produced in parallel.

Hereinafter, functions and effects of the present embodiment will be described.

The temperature adjustment rod 32 of the present embodiment has an annular projection portion 33 that protrudes in the radial direction and comes into contact with the inner peripheral surface of the preform 10. The projection portion 33 conducts heat between the temperature adjustment rod 32 and the preform 10. As a result, in the present embodiment, the predetermined part in the axial direction of the preform 10 can be cooled from the inside by the projection portion 33 to adjust the temperature, and the thickness distribution of the container to be blow-molded can be improved.

In addition, the tip end of the temperature adjustment rod 32 comes into contact with the bottom portion of the preform 10 to restrict the shrinkage in the axial direction of the preform 10. Then, the projection portion 33 comes into contact with the inner peripheral surface of the preform 10 to restrict shrinkage in the radial direction of the preform 10. As a result, variations in the shape of the preform 10 at the time of temperature adjustment are suppressed, and it is easy to apply an appropriate temperature distribution to the preform 10 in each blow molding cycle.

In addition, the projection portion 33 of the present embodiment is provided on the half ring body 34 or the contact ring 35 attachable to and detachable from the temperature adjustment rod 32, and can adjust the position in the axial direction. As a result, it is possible to easily adjust the position where the temperature of the preform 10 is adjusted according to the specification of the container or the like.

The protruding amount in the radial direction of the projection portion 33 can be changed by replacing the half ring body 34 or the contact ring 35. As a result, the temperature adjustment time by the projection portion 33 can be adjusted by changing the timing at which the shrinking preform 10 and the projection portion 33 come into contact with each other.

Here, when the material of the preform 10 is polyethylene (PE) or high-density polyethylene (HDPE), the thermal shrinkage is higher than that of PET or the like, and the preform 10 is easily shrunk and deformed at the time of temperature adjustment. Moreover, it is known that these materials have less strain hardening property than PET and the like, and it is difficult to adjust the thickness during blow molding. The strain hardening property refers to a property of increasing the strength by molecular orientation until the thickness becomes uniform in such a manner that the weakest portion (usually the hottest part) of the preform first reaches the yield point and the next weakest portion starts to stretch during the blowing process. Therefore, when a preform of PE or HDPE is blow-molded, it is extremely important to appropriately adjust the temperature before blowing while suppressing shrinkage deformation of the preform. According to the present embodiment, it is possible to easily adjust the temperature of the preform suitable for container molding of PE or HDPE.

The present invention is not limited to the above-described embodiments, and various improvements and design changes may be made without departing from the gist of the present invention.

For example, in the above embodiment, a plurality of projection portions 33 may be provided in the axial direction of the temperature adjustment rod 32.

In addition, the embodiments disclosed herein are to be considered in all respects as illustrative and not restrictive. The scope of the present invention is indicated not by the above description but by the claims, and it is intended that the scope thereof includes meanings equivalent to the claims and all modifications within the scope.

The invention claimed is:

1. A temperature adjustment mold for adjusting a temperature of a preform that is injection-molded, has a bottomed shape, and is made of resin, the mold comprising
   a rod portion inserted into the preform and extending in an axial direction of the preform, wherein
   the rod portion includes an annular projection portion that protrudes in a radial direction of the rod portion and comes into contact with an inner peripheral surface of the preform,
   the rod portion comes into contact with a bottom portion of the preform to restrict shrinkage in the axial direction of the preform,
   the projection portion restricts shrinkage in a radial direction of the preform, conducts heat between the rod portion and the preform, and adjusts a temperature at a predetermined part in an axial direction of the preform, and
   the projection portion is adjustable in position in the axial direction.

2. The temperature adjustment mold according to claim 1, wherein the projection portion is attachable to and detachable from the rod portion.

3. The temperature adjustment mold according to claim 1, further comprising
   a cavity mold that accommodates the preform and heats the preform from an outer peripheral side.

4. An apparatus for producing a resin container, comprising:
   an injection molding unit configured to injection-mold a preform that has a bottomed shape and is made of resin;
   a temperature adjustment unit configured to adjust a temperature distribution in the axial direction of the preform including residual heat from injection molding by using the temperature adjustment mold according to claim 1; and
   a blow molding unit configured to blow-mold the preform adjusted in temperature to produce a resin container.

5. A method for producing a resin container, comprising:
   injection-molding a preform that has a bottomed shape and is made of resin;
   adjusting a temperature distribution in the axial direction of the preform including residual heat from injection molding by using the temperature adjustment mold according to claim 1; and
   blow-molding the preform adjusted in temperature to produce a resin container.

* * * * *